United States Patent
Johnson

[11] 3,845,567
[45] Nov. 5, 1974

[54] TAPERED KEYWAY CHECKING GAUGE

[75] Inventor: Robert Allen Johnson, Ottumwa, Iowa

[73] Assignee: Deere & Company, Moline, Ill.

[22] Filed: Dec. 3, 1973

[21] Appl. No.: 421,343

[52] U.S. Cl. .............................................. 33/174 E
[51] Int. Cl. ........ G01b 5/24, G01b 3/46, G01b 3/56
[58] Field of Search............. 33/174 E, 162, 180 AT

[56] References Cited
UNITED STATES PATENTS
2,642,670   6/1953   Dow .................................. 33/174 E
FOREIGN PATENTS OR APPLICATIONS
921,358   11/1954   Germany........................... 33/174 E OTHER PUBLICATIONS
Haim Murro, American Machinist, 09/28/1953, pg. 150, "Internal, External Tapers Checked with Shop Gages."

Primary Examiner—Louis R. Prince
Assistant Examiner—Willis Little
Attorney, Agent, or Firm—H. Vincent Harsha

[57] ABSTRACT

A gauge for checking a tapered keyway and including an elongated body insertable lengthwise into the keyway and having a straight side seating on the side of the bore opposite the keyway. At the end of the body inserted in the keyway is an inclined surface engageable with the tapered side of the keyway to limit the insertion of the gauge body into the keyway and establish a gauging position. A shiftable gauge element is mounted on the body for limited longitudinal shifting thereon, the gauge element being shifted along the body into the keyway until it is stopped by engagement with the tapered side of the keyway. The gauge element has a transversely extending recess with longitudinally spaced sides parallel to the surface adjacent the keyway opening, and when said surface lies between the two recess sides, the height of the keyway at the opening is acceptable. The body also has a transverse recess with longitudinally spaced sides adjacent and parallel to a surface on the shiftable gauge element and when the gauge element surface lies between the opposite recess sides on the body, the angle of taper is within acceptable limits.

10 Claims, 8 Drawing Figures

PATENTED NOV 5 1974    3,845,567
FIG. 3  FIG. 4  FIG. 5
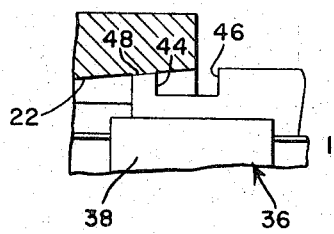
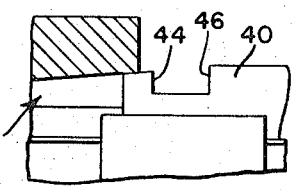
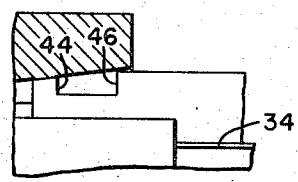
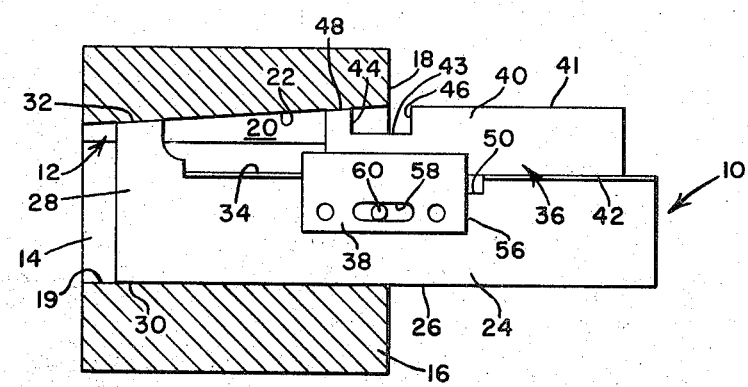
FIG. 2
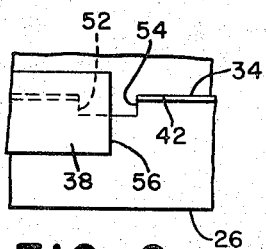
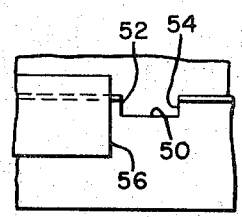
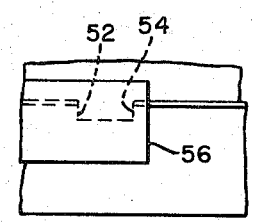
FIG. 6  FIG. 7  FIG. 8
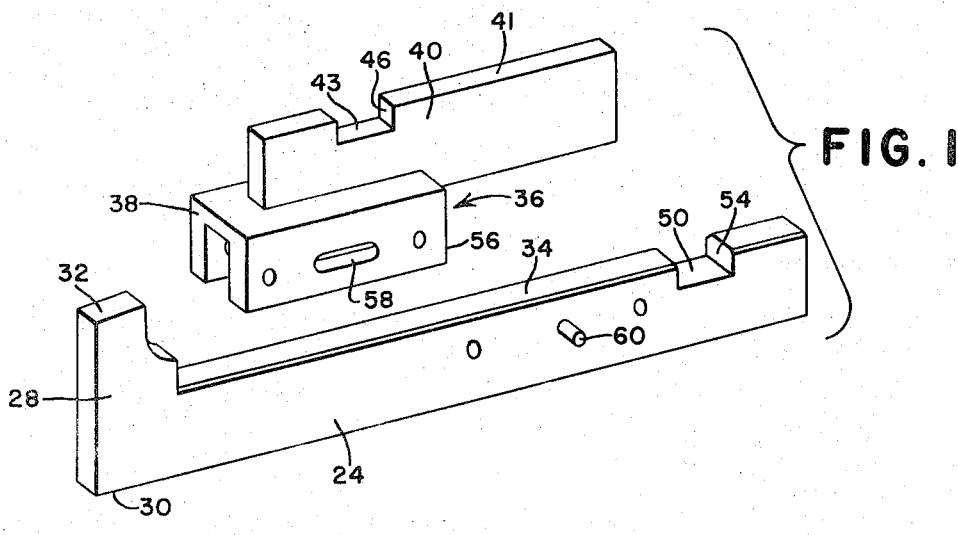
FIG. 1

TAPERED KEYWAY CHECKING GAUGE

BACKGROUND OF THE INVENTION

This invention relates to an inspection gauge and more particularly, to an improved gauge for checking a tapered keyway.

A tapered key is frequently used to connect a member, such as a hub, a gear, or the like, to a shaft, the tapered keyway conventionally being machined along one side of a cylindrical, axial bore through the member. To check the tapered keyway, it is desirable to check both the height of the keyway and the angle of taper of the tapered side. Previous systems for checking the height and the taper angle have required the use of separate gauges, or have been relatively complicated and expensive.

SUMMARY OF THE INVENTION

According to the present invention, there is provided an improved gauge for simultaneously checking the height of the keyway and the angle of the tapered side. More specifically, the improved gauge checks the height of the keyway and the angle of the keyway independently of one another.

An important feature of the invention resides in the simple and rugged construction of the gauge, which is also simple to operate and quickly checks the height and angle of the keyway.

Another feature of the invention resides in the fact that the gauge does not require a master for setting the gauge.

BRIEF DESCRIPTION OF THE DRAWINGS

FIG. 1 is an exploded perspective view of a tapered keyway checking gauge embodying the invention.

FIG. 2 is a side elevation view of the gauge in use in checking a tapered keyway.

FIG. 3 is a view of the portion of the gauge that indicates the height of the keyway, showing the relationship between the keyway and the gauge when the height is within acceptable limits.

FIGS. 4 and 5 are views similar to FIG. 3, but showing a condition of the gauge when the keyway height is respectively too little and too great.

FIG. 6 is a side elevation view of the portion of the gauge that indicates the angle of the keyway, showing the condition of the gauge when the angle is within acceptable limits.

FIGS. 7 and 8 are views similar to FIG. 6, but showing the conditions of the gauge when the keyway taper is outside of the acceptable limits.

DESCRIPTION OF THE PREFERRED EMBODIMENT

The invention is embodied in a gauge, indicated in its entirety by the numeral 10, for checking a tapered keyway 12 along a cylindrical bore 14 in a member 16, that is to be mounted on a shaft or the like. As is well known, the member 16 could be a gear, a pulley, a hub or some similar member that is keyed to a shaft inserted in the bore 14, the shaft also being provided with a keyway, with a tapered key being inserted in the shaft keyway and the keyway 12 to lock the member to the shaft. The member 16 has a flat surface 18 adjacent the keyway opening and perpendicular to the axis of the bore, and the bore has a cylindrical sidewall 19. The keyway 12 has opposite sidewalls 20 and a tapered wall 22 is inclined relative to the bore axis.

The gauge has an elongated, rectangular cross sectioned body 24 having a straight side or edge 26 that seats against the bore sidewall 19 opposite the keyway 12 when the gauge 10 is inserted into the bore. A first gauge element 28 is provided on the end of the body 24 that is inserted into the bore, the gauge element 28 being an integral part of the body and including a bottom surface 30 that is a continuation of the straight side or edge 26 of the body and also seats on the sidewall of the bore opposite the keyway. The gauge element also includes a top or inclined surface 32 opposite the surface 30 and engageable with the tapered wall 22 when the gauge 10 is inserted into the bore 14 and keyway 12, the angle of the surface 32 substantially corresponding to the angle of the tapered wall 22. As is apparent, the thrust of the gauge into the bore and keyway is limited by the engagement of the tapered keyway wall 22 by the inclined surface 32 of the gauge element and the engagement of the bore sidewall 19 opposite the keyway by the bottom surface 30 of the gauge element, as shown in FIG. 2, and when the gauge has achieved said position, it is positioned for gauging the keyway.

The body 24 has a top edge or rail 34 opposite and parallel to the straight side or edge 26, and a second gauge element 36 is longitudinally slidable along the rail 34 to a limited degree, the longitudinal movement of the second gauge element being in an axial direction relative to the bore. The second gauge element 36 includes an inverted U-shaped or channel-shaped saddle member 38 that straddles the body 24, with the central portion of the saddle member 38 riding on the rail 34, the opposite sides of the saddle member 38 being spaced substantially the same distance as the width of the body so that the gauge element 36 shifts only in a longitudinal direction.

The second gauge element 36 includes an elongated, upright, rectangular cross section gauge portion 40 that is coplanar with the body 24 and includes parallel top and bottom edges 41 and 42, the bottom edge 42 riding along the rail 34.

A channel-shaped groove or recess 43 extends transversely across the top edge 41 of the gauge portion 40 adjacent the inner end of the gauge portion and has transversely extending, upright, parallel inner and outer sides 44 and 46, which are parallel and adjacent to the surface 18 on the keyed member 16 when the gauge is in its gauging position, as shown in FIG. 2. As is apparent, the gauge portion 40 includes a top, inclined gauge surface 48 that corresponds to and engages the tapered keyway wall 22 to limit the insertion of the gauge element 36 into the bore end keyway. The greater the height of the keyway at the keyway opening, the further the gauge element 36 will move into the keyway before it seats against the tapered wall 22, and the recess sides 44 and 46 provide an indicator means for measuring the distance that the gauge element 36 is inserted in the keyway and thereby measuring the height of the keyway. When the surface 18 of the keyed member 16 is disposed between the recess sides 44 and 46, as shown in FIGS. 2 and 3, the height of the keyway is within acceptable limits, but when both the inner and outer recess sides 44 and 46 are outside of the keyway, as shown in FIG. 4, the keyway height is too small. Conversely, if both the sides 44 and 46 are within the keyway, as shown in FIG. 5, the height is too great.

The body 24 also has a transversely extending, channel-like recess 50 across its top edge or rail 34, similar to the recess 43. The recess 50 also has inner and outer, parallel, opposite, transversely extending sides 52 and 54 respectively, and the saddle member 38 of the second gauge element 36 has a transverse, upright outer end wall 56 parallel and adjacent to the recess sides 52 and 54. The recess sides 52 and 54 provide a means for indicating or visually observing the position of the second gauge element 36 relative to the body 24 by observing the relationship of the gauge element end wall 56 relative to the recess sides 52 and 54. As is apparent, the position of the gauge element 36 relative to the body 24 is dependent upon the taper angle of the tapered wall 22, the steeper the taper or the greater the angle of inclination of the wall 22, the further the gauge element 40 will be toward the first gauge element 28 (to the left in FIG. 2). When the taper angle is within acceptable limits, the end wall 56 will be between the recess sides 52 and 54, as shown in FIGS. 2 and 6, while if the angle is too great, and the gauge element 40 is too far to the left relative to the body 24, the end wall 46 will be to the left of both the recess sides 52 and 54 as shown in FIG. 7. Conversely, if the angle is too small, the end wall 56 will be to the right of both the recess sides 52 and 54, as shown in FIG. 8.

The saddle member 38 of the second gauge element 36 is provided with a longitudinal slot 58 through one of its depending legs, and a transversely oriented pin 60 extends outwardly from the side of the body 24 into the slot 58. As is apparent, the pin 60 holds the gauge element 36 on the body 24, while permitting limited longitudinal shifting of the gauge element along the rail 34, the slot being sufficiently long to permit shifting of the gauge element to positions which indicate unacceptable keyway angles, as shown in FIGS. 7 and 8.

In operation, as is apparent from the above, to inspect the keyway 12, the gauge 10 is inserted into the bore in the keyway with the straight side 26 of the body 24 seating against the sidewall of the bore 14 opposite the keyway 12. The gauge body is inserted into the bore with the top of the gauge element 28 in the keyway 12, until the gauge element surface 32 engages the tapered wall 22 of the keyway, at which time the gauge is in its gauging position. The second gauge element 36 is then shifted along the body 24 until the gauge surface 48 also seats against the keyway tapered wall 22, and if the member surface 18 lies between the recess sides 44 and 46, and the outer end 56 of the gauge element saddle member is disposed between the inner and outer sides 52 and 54 of the recess 50 in the body 24, as shown in FIG. 2, both the height of the taper and the taper angle are satisfactory. As previously described, if either of the above conditions are not met, the keyway is out of tolerance. As is apparent, the improved gauge permits the simultaneous checking of both the keyway angle and the keyway height, independently of one another, utilizing only a single, simple, and inexpensive tool.

I claim:

1. A gauge for checking a tapered keyway along a bore in a member having a surface adjacent the keyway opening, the keyway having a tapered wall inclined relative to the sidewall of the bore opposite the keyway, said gauge comprising: an elongated body insertable lengthwise into the bore and engageable with the sidewall of the bore opposite the keyway; a first gauge element connected to the body and having a first surface engageable with said bore sidewall opposite the keyway and a second surface opposite the first surface and engageable with the tapered wall of the keyway to establish a set position of the body in the bore and keyway; a second gauge element mounted on the body for limited shifting thereon in a longitudinal direction parallel to the axis of the bore and including a gauging surface engageable with the tapered wall of the keyway in response to longitudinal shifting of the second gauge element on the body when the body is in said set position, the second gauge element having first and second longitudinally spaced indicator means adjacent the surface of said member and respectively defining the opposite acceptable positions of the second gauge element relative to said surface to indicate the acceptable keyway heights adjacent said surface, the second gauge element having an indicator element and the body having third and fourth indicator means adjacent said indicator element respectively defining the opposite limits of acceptable longitudinal positions of the second gauge element relative to the body to indicate the limits of the angle of the tapered wall of the keyway.

2. The invention defined in claim 1 wherein the second gauge element includes a recess extending transversely relative to the keyway and having opposite sides spaced apart in a longitudinal direction relative to the keyway and respectively forming said first and second indicator means.

3. The invention defined in claim 2 wherein the body has a transversely extending recess with opposite, longitudinally spaced, transversely extending sides respectively forming the third and fourth indicator means.

4. The invention defined in claim 3 wherein the second gauge element includes a transversely extending surface parallel and adjacent to the third and fourth indicator means and forming the indicator element on the second gauge element.

5. The invention defined in claim 4 wherein the body has a straight side engageable with the sidewall of the bore opposite the keyway and the first surface on the first gauge element is formed by the body straight side.

6. The invention defined in claim 5 wherein the second surface on the first gauge element is inclined relative to the body straight side and substantially correponds to the inclination of the tapered sidewall of the keyway.

7. The invention defined in claim 6 wherein the gauging surface on the second gauge element is inclined and substantially corresponds to the angle of inclination of the tapered sidewall of the keyway.

8. The invention defined in claim 1 wherein the second surface on the first gauge element is inclined relative to the body straight side and substantially corresponds to the inclination of the tapered sidewall of the keyway.

9. The invention defined in claim 1 wherein the gauging surface on the second gauge element is inclined and substantially corresponds to the angle of inclination of the tapered sidewall of the keyway.

10. The invention defined in claim 1 wherein the body has a straight side engageable with the sidewall of the bore opposite the keyway and the first surface on the first gauge element is formed by the body straight side.

* * * * *